Oct. 26, 1943. H. PAQUETTE 2,332,595
COMBINED DOUGHNUT AND BISCUIT CUTTER
Filed Feb. 19, 1943
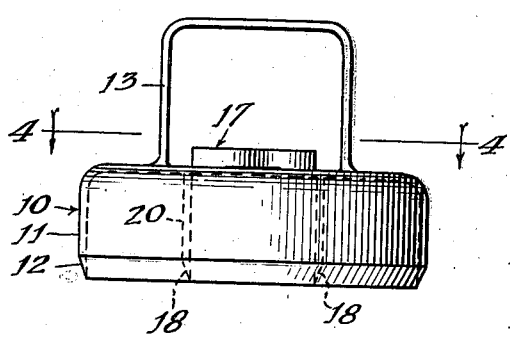
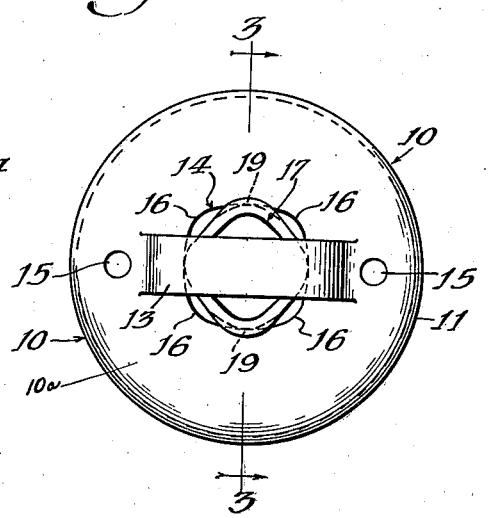
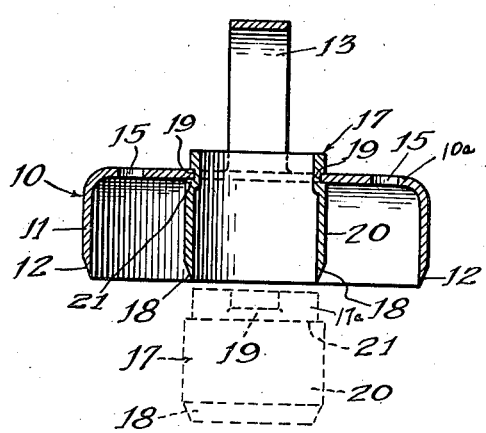
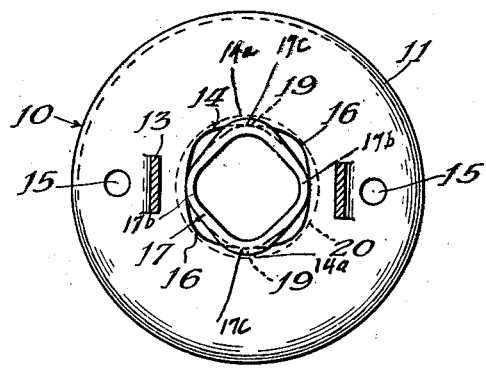
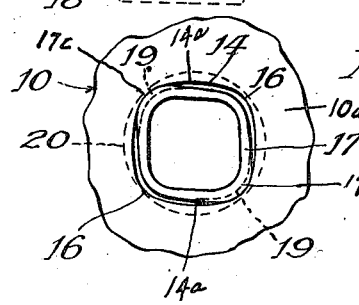
Inventor:
Herman Paquette Patented Oct. 26, 1943

2,332,595

UNITED STATES PATENT OFFICE 2,332,595

COMBINED DOUGHNUT AND BISCUIT CUTTER

Herman Paquette, Chicago, Ill.

Application February 19, 1943, Serial No. 476,482

4 Claims. (Cl. 30—301)

This invention relates to a combined doughnut and biscuit cutter and concerns itself with a structure that can be readily cleansed and converted from one form to the other.

It is an object of this invention to provide a doughnut cutter having a central tubular cutting element adapted to be removed in a novel manner for cleansing purposes and when it is desired to use the device for cutting biscuit dough.

According to this invention, there is provided a doughnut cutter consisting of an outer cylindrical cutting member and an interior tubular cutting member adapted to be removed from the first mentioned cutting member by a turning movement; the first member having an aperture of unequal dimensions for receiving the interior member in one position and securing the same in a different position.

The invention comprises the novel structure and combination of parts hereinafter described and more particularly pointed out and defined in the appended claims.

In the accompanying drawing which illustrates a preferred form of this invention and in which similar reference numerals features in the different views:

Fig. 1 is a side elevational view of a doughnut cutter involving this invention.

Fig. 2 is a top plan view of the same.

Fig. 3 is a sectional view taken upon the line 3—3 of Fig. 2 looking in the direction of the arrows.

Fig. 4 is a part sectional and part top plan view taken upon the line 4—4 of Fig. 1 looking in the direction of the arrows, and Fig. 5 is a fragmentary top plan view illustrating the parts in different positions for removal of the inner cutter.

In referring now to the drawing, there is shown a doughnut cutter 10 comprising a circular top portion 10a and a cylindrical flange 11 terminating in a cutting edge 12. A U shaped handle 13 is attached to the top for operating the cutter.

An aperture 14 is formed in the top 10a. This aperture has unequal dimensions as clearly shown in Fig. 2; it has two sets of diametrically opposite enlargements 16. Between the enlargements the aperture is restricted or of less diameter for a purpose that will later appear. The top is also provided with suitable air holes 15.

A tubular inner cutting member 17 is provided with an upper reduced portion 17a of a configuration as shown in Fig. 4 for extension into said aperture 14. This reduced portion has a substantially square interior, but a different exterior. The exterior is so formed that the dimension between one pair of opposite corners 17b is substantially equal to the most restricted diameter of the aperture 14 while the dimension between the other opposite corners 17c is substantially equal to the diameter of each set of enlargements 16. The corner portions 17c are extended and grooved as indicated at 19 providing a shoulder 21 therebelow abutting against the top 10a. The wall 20 of the interior cutting member is bevelled at the bottom as indicated at 18 to provide a cutting edge.

In the positions shown in Figs. 1 to 4, the extended grooved portions 19 are shown interlocked with the wall of the aperture 14 at restricted portions 14a. With the parts in such positions, the device is designed to cut doughnuts. When it is desired to cleanse, sharpen or convert the device to a biscuit cutter, the interior cutting member may be rotated in either direction to move or bring the enlarged grooved portions 19 into enlargements 16 of the aperture as shown in Fig. 5. In this position, the interior cutting member may be removed by an axial movement as indicated by dotted lines in Fig. 3. By a reverse operation, the cutters may be re-assembled.

It will be evident, that the cutting members may be easily dis-assembled and assembled by a limited rotational movement. This is advantageous for cleansing purposes, for sharpening purposes or for convertible purposes. It will be further evident that the device is exceedingly simple and can be manufactured very economically.

I am aware that many changes and modifications may be made without departing from the principles of this invention so I do not propose limiting the patent granted thereon otherwise than necessitated by the appended claims.

I claim as my invention:

1. In a doughnut cutter, an exterior cutting member comprising a top portion having an air hole and a central aperture with an enlarged portion and a restricted portion and an interior cutting member having an end with an enlarged grooved portion fitting in the enlarged portion of said aperture and said grooved portion being adapted for engaging the wall of said restricted portion of said aperture thru a rotational movement.

2. In a doughnut cutter, an exterior cutting member having a top portion with a central aperture, said aperture having two enlarged portions and restrictions between said enlarged portions, an interior cutting member having a reduced end portion secured in said aperture, said reduced end portion having extended grooved parts engaging the wall of said aperture at certain restrictions, said interior member being rotatable in either direction for moving the grooved parts into enlarged portions of the aperture for removal of said interior member.

3. In a doughnut cutter, an exterior cutting member comprising a top portion having an opening, said opening having an enlargement and an adjacent restricted portion and an interior cutting member having an enlargement on one end portion, said enlargement on said end portion having a groove engaging the restricted portion of said opening, said interior member being adapted to be rotated to bring the enlargement on its end portion into the enlargement in said opening for removal of said interior cutting member by an axial movement.

4. In a doughnut cutter, an exterior cutting member having a top portion provided with an opening, an interior cutting member provided with an end portion in said opening, said end portion having spaced enlarged grooved parts engaging the wall of said opening for retaining said member against axial movement, said opening having enlargements for receiving said grooved parts thru a rotational movement for the purpose set forth.

HERMAN PAQUETTE.